C. J. KERN & J. E. THEBAUD.
WINDOW CLEANING DEVICE.
APPLICATION FILED OCT. 19, 1911.
1,043,523.
Patented Nov. 5, 1912.
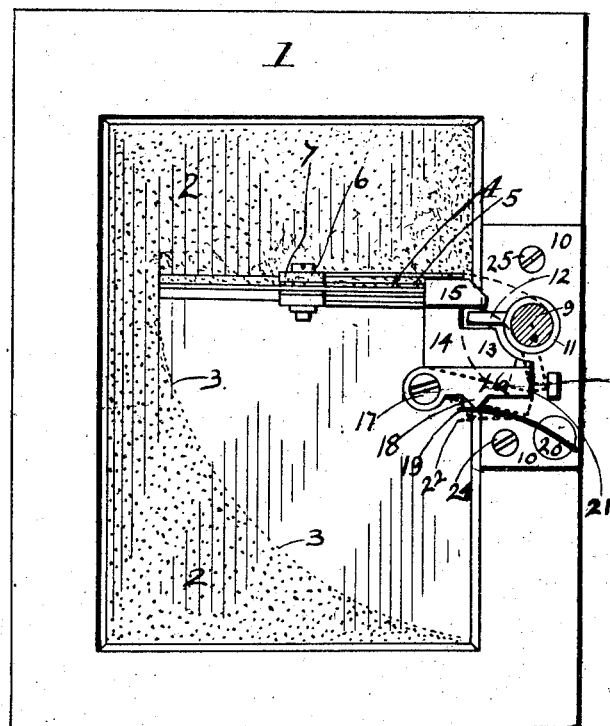
Fig. 1.
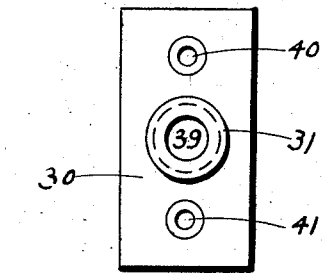
Fig. 5.
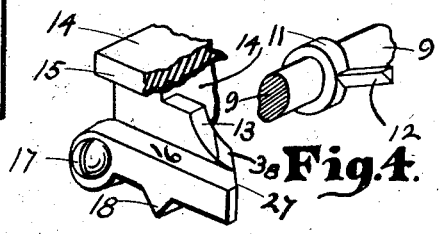
Fig. 3.
Fig. 4.
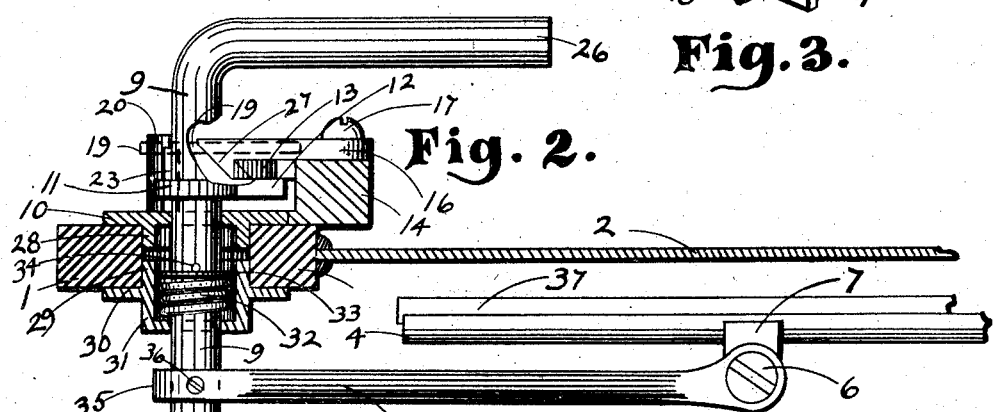
Fig. 2.
WITNESSES:
Frank J. Peterson
George A. Peterson
INVENTORS
Charles J. Kern
and J. Edward Thebaud,
by their attorney
J. Edw. Thebaud

UNITED STATES PATENT OFFICE.

CHARLES J. KERN AND JOHN EDWARD THEBAUD, OF BUFFALO, NEW YORK; SAID THEBAUD ASSIGNOR TO SAID KERN.

WINDOW-CLEANING DEVICE.

1,043,523.  Specification of Letters Patent.  Patented Nov. 5, 1912.

Application filed October 19, 1911. Serial No. 655,573.

*To all whom it may concern:*

Be it known that we, CHARLES J. KERN and JOHN EDWARD THEBAUD, citizens of the United States, and residents of Buffalo, New York, have invented certain new and useful Improvements in Window-Cleaning Devices, and do hereby declare the following to be a full, clear, and exact description of our invention, such as will enable others skilled in the art to which it appertains to make and use the same.

Our invention relates particularly to that class of window cleaners which are operated from the inside of the window to clean the outside of the same.

The objects of our invention are to provide simple and effective means for rotating a wiper against the window glass in a manner to insure contact throughout the full length of the wiper with the glass and to provide means for automatically moving the wiper away from the glass when rotated into position for wiping.

The details of construction of our invention are illustrated in the accompanying drawings in which—

Figure 1 illustrates an elevation of a window sash and glass with our invention in position thereon. In Fig. 2, is shown a sectional plan of our device positioned on a window sash and having the wiper held away from the glass. Fig. 3, is a perspective view of the cam and pawl attached. Fig. 4, is a perspective view of a portion of the shaft, showing a tongue projecting at right angles therefrom. Fig. 5, is an elevation of the outside bearing plate.

The various parts of our device as illustrated in the figures are numbered as follows: In Fig. 1, 1 is the frame of a sash containing the glass 2, shown mostly covered with opaque particles, except within the arc 3, which is clear as left cleaned by the rotation of the wiper 4. Pivoted upon the arm 5 at the bolt 6 is the holder 7, which supports the wiper 4. Within the circle of the magnifying glass 8 is shown parts of the arm 5 and the wiper 4. The arm 5 is attached to the outer end of the shaft 9, which is shown in section journaled in the plate 10. An expanded portion 11 of the shaft 9 has integral therewith a beveled tongue 12 projecting at right angles from said shaft. Adapted to coöperate with the tongue 12 is the flat lip 13, projecting from the block 14 which is integral with the plate 10. The upper end of the block 14 has an extension 15 projecting over the tongue 12 to limit its upward motion, while in the downward motion of the tongue 12 on the outside of the lip 13 a pawl 16 is adapted to be engaged by the end of said tongue. The said pawl is pivoted by the screw 17 upon the block 14 and has an appendage 18 which engages a flat spring 19 positioned in a post 20, which post is mounted upon the plate 10. In the dotted position of the pawl 16 and the tongue 12 the point of escapement is marked 21, and the consequent depressed position of the spring is shown at 22. 23 is a lug limiting the rotation of the tongue 12 in its downward movement. 24 and 25 are screws which secure the plate 10 to the sash 1.

In Fig. 2, the shaft 9 is shown bent to form the handle 26. Said shaft is illustrated as broken away in part to give a clear plan view of the beveled end 27 of the pawl 16. The plate 10, shown in section in this figure has a cylindrical extension 28 positioned within a hole in the sash 1, in which is also positioned a cylindrical extension 29 integral with the outer plate 30. The outer end 31 of said extension 29 is formed into a bearing in which is journaled the shaft 9. Within said cylindrical extensions, surrounding the shaft 9 is an annular space adapted to be occupied by the spring 32 shown compressed by the washer 33 and the pin 34 which is positioned through the shaft 9. The tongue 12 is shown pressed against the inner side of the lip 13. The arm 5 is attached at the end 35 by the screw 36 to the shaft 9. The other end of said arm 5 has a bolt 6 journaling the holder 7 thereon. Within said holder is held the wiper 4 having an elastic strip 37.

In the Fig. 3, a perspective view of the detached block 14 is illustrated, having pivoted thereon the pawl 16 by the screw 17. The beveled surface 27 of the end of the pawl 16 continues upon an extension 38 thereof which conforms to the shape of the end of the lip 13 in generating a cam.

In Fig. 4, is shown a portion of the shaft 9 having the expanded portion 11 and the tongue 12 turned up to show how it is beveled in order to engage properly with the beveled surface 27 of the end of the pawl 16, illustrated in Figs. 2 and 3.

In Fig. 5, the plate 30 is the same as shown in section in Fig. 2, having the outward cup-shaped extension 31 in which is the hole 39 adapted to have journaled therein the shaft referred to in connection with the other figures. 40 and 41 are countersunk screw holes through which screws are passed when attaching the said plate 30 to the outside of the sash.

Having described the various parts in connection with the figures, their respective functions in operation are as follows: The handle 26, shown in Fig. 2 as being parallel to the arm 5, is adapted to be turned through an angle a little greater than 90 degrees, being limited by the extension 15 and the lug 23. Assuming that the handle 26 is in the uppermost position to start with, the tongue 12 will be outside of the lip 13, having been forced in that position by the action of the spring 32 through the washer 33, the pin 34 and the shaft 9. In this position the wiper will be pressed against the glass 2, on the outside on account of the inward thrust of shaft 9 with which it is connected. As the handle is turned downward the tongue 12 travels over the outer face of the lip 13 and the wiper remains in contact with the glass as it in consequence travels downward over the outside of the glass. In the continued rotation of the handle 26 the tongue 12 engages the pawl 16 depressing it and the spring 19 until the end of the tongue escapes, in further travel, from the pawl 16 and clears the same coming in contact with the lug 23; which limits its further movement. The pawl then being free to be acted upon by the spring 19, regains its former position in relation to the lip 13 and in so doing has positioned the beveled surface 27 of the pawl 16 in behind the tongue 12. In the rotation of the handle just described the wiper has been caused to sweep over and in contact with the outside of the glass dislodging any foreign matter in its path that is easily removed, such as snow, rain or soot and has taken a perpendicular position. Now, upon reversing the rotation of the handle 26, the tongue, which is beveled, engages the beveled surface 27 and in continued rotation is forced toward the sash, causing the shaft to move outward, compressing the spring 32 and carrying the wiper away from the glass. Further motion in the same direction brings into play the cam-action of the pawl and lip in conjunction with the beveled tongue and in the continued upward journey of the wiper it is held off from the surface of the glass until the tongue 12 escapes from the upper end of the lip 13 and being released, the spring then comes into play by exerting its pressure to force the shaft into the first position assumed as above described, from which position the operation may be repeated in wiping again the outer surface of the glass. The advantage gained in automatically holding the wiper away from the glass during its upward movement and against the glass in its downward movement resides in the fact that in operation the wiper is used in action in the most natural way for best results in traveling over the surface of the glass whereby the foreign matter is swept to one side and left there without dragging part of it back as happens with other forms of wipers which keep the wiper pressed against the surface of the glass during both movements of the wiper.

We are aware that there are other devices for wiping windows employing the combination of a shaft, a handle, an arm, a spring, and a wiper held against the glass by the pressure of the spring along the shaft and operated from the inside of the window but we know of no device of this kind which automatically operates by means of a cam-action of its parts to cause the wiper to leave the glass and be held away therefrom during one of its rotary movements and is locked against any outward movement during most of the journey of the wiper in contact with the glass as happens with our device by virtue of the movement of the tongue 12 over the outside of the lip 13 during the said last mentioned journey.

Having described our invention, we claim,

1. A window cleaner, comprising a shaft provided with a wiper at one end, a handle at the other end, an operating spring and a bearing for the shaft, a cam operating mechanism comprising a lip formed integral with said bearing and disposed in spaced relation thereto, the inner side of said lip being beveled, a pivoted pawl mounted on said bearing and having a beveled portion overlapping the inner side of said lip to provide a two-part cam surface, and means whereby upon operation of said handle the shaft is rotated and the cam mechanism operated in governing the movement of the wiper.

2. A window cleaner, comprising a shaft provided with a wiper at one end and having a handle at the other end, and also provided with a projecting tongue intermediate its ends and having an operating spring on the shaft and a bearing for the shaft, a cam operating mechanism comprising a beveled lip and a pawl having a beveled part cooperating with the beveled portion of the lip to form a cam surface, said bearing having lugs spaced from the lip and providing stops for engagement by the projecting tongue of the shaft to limit rotational movement of the latter, said tongue operating over said cam surface and forcing the shaft longitudinally from its normal position, the shaft being forced by said spring automatically to its normal position when the said tongue engages one of said stop lugs with the tongue forced to the outer side of said lip, rotation of the shaft in the opposite direction by its handle bringing said tongue into engagement with said pawl and depressing it, said pawl returning to its normal position automatically as said tongue engages the other of said stop lugs.

3. A window cleaner, comprising a shaft provided with a wiper at one end, an operating spring on the shaft, a bearing for the shaft, means including a crank handle, a cam operating mechanism consisting of a fixed and a movable part, and a tongue on said shaft to engage the fixed and movable parts of the cam mechanism to move the wiper away from the window pane on one stroke of the crank handle and on the reverse stroke to move the movable part of the cam mechanism out of coöperative relation with the fixed part thereof, and thereby permit the tongue to return to its normal position, the movable part of the cam mechanism assuming its normal position when the tongue escapes therefrom on its reverse stroke.

CHARLES J. KERN.
J. EDWARD THEBAUD.

Witnesses:
R. L. GRAHAM,
A. S. JERMANN.

Copies of this patent may be obtained for five cents each, by addressing the "Commissioner of Patents, Washington, D. C."